United States Patent [19]

Markbreiter et al.

[11] Patent Number: 4,522,636

[45] Date of Patent: Jun. 11, 1985

[54] PIPELINE GAS PRESSURE REDUCTION WITH REFRIGERATION GENERATION

[75] Inventors: Stephen J. Markbreiter, Edison, N.J.; Hans P. Schorr, Douglaston, N.Y.

[73] Assignees: Kryos Energy Inc., New York; The Brooklyn Union Gas Company, Brooklyn, both of N.Y.

[21] Appl. No.: 578,074

[22] Filed: Feb. 8, 1984

[51] Int. Cl.[3] .......... B01D 53/14

[52] U.S. Cl. .......... 55/23; 55/32; 55/208; 62/87; 62/402

[58] Field of Search .......... 55/23, 29, 32, 171, 55/208; 62/115-117, 86, 87, 402, 88

[56] References Cited

U.S. PATENT DOCUMENTS

| | | | |
|---|---|---|---|
| 3,002,362 | 10/1961 | Morrison | 62/87 |
| 3,355,903 | 12/1967 | La Fleur | 62/402 |
| 3,360,944 | 1/1968 | Knapp et al. | 62/12 |
| 3,735,601 | 5/1973 | Stannard | 62/87 |
| 3,886,757 | 6/1975 | McClintock et al. | 62/20 |
| 4,312,851 | 1/1982 | Isalski et al. | 55/23 X |
| 4,420,950 | 12/1983 | Bodas et al. | 62/402 |

*Primary Examiner*—Charles Hart
*Attorney, Agent, or Firm*—Paul W. Garbo

[57] ABSTRACT

The high pressure of pipeline gas is reduced to the low pressure of a distribution system with simultaneous generation of refrigeration by passing the gas through two successive centrifugal compressors driven by two turbo-expanders in which the compressed gas is expanded to successively lower pressures. Refrigeration is recovered from the gas as it leaves each turbo-expander. Methanol is injected into the pipeline gas before it is expanded to prevent ice formation. Aqueous methanol condensate separated from the expanded gas is distilled for the recovery and reuse of methanol.

12 Claims, 3 Drawing Figures

PIPELINE GAS PRESSURE REDUCTION WITH REFRIGERATION GENERATION

BACKGROUND OF THE INVENTION

This invention relates to the generation of refrigeration in the course of reducing the pressure of pipeline gas to the pressure of a gas distribution system. More specifically, the invention relates to a process for maximizing the generation of refrigeration when the pressure of pipeline gas is reduced at a pressure letdown control station to supply the gas distribution system.

The pressure of pipeline gas is reduced at many letdown stations merely by isenthalpic expansion, i.e., by passage through a reducing valve. Such pressure reduction is a waste of valuable energy.

Two schemes for utilizing the energy available in pipeline gas at letdown control stations are the generation of electrical energy and the liquefaction of natural gas. To produce electrical energy, the pipeline gas is passed through an expansion turbine which drives an electric generator. U.S. Pat. No. 3,360,944 illustrates a process wherein pipeline natural gas is expanded with the performance of work to produce refrigeration utilized to liquefy a portion of the natural gas.

Depending on the location of each letdown control station, the generation of electric energy or the production of liquefied natural gas may not be economically attractive. In such case, the conversion of the energy available in the pipline gas reaching the letdown station to bulk, low-cost refrigeration may be a preferred and valuable alternative particularly where local industries require refrigeration. The frozen food industry, suppliers of ice and manufacturers of dry ice are examples of industries which consume large quantities of refrigeration.

Accordingly, a principal object of this invention is to convert expansion energy as derived from pipeline gas to low-cost refrigeration.

Another important object is to maximize the generation of refrigeration from the isentropic expansion of the pipeline gas, i.e., expansion with the performance of work.

These and other objects and advantages of the invention will be evident from the description which follows.

SUMMARY OF THE INVENTION

In accordance with this invention, pipeline gas reaching a letdown control station usually at a pressure in the range of about 100 to 400 psia (pounds per square inch absolute) is passed through two successive stages of compression to increase its pressure at least about 150 psi and then is work expanded in two successive stages with intermediate reheating of the gas and recovery of refrigeration from the expanded gas leaving each expander, the doubly expanded gas being delivered at the desired pressure, say 30 psia, of the distribution system. Frequently the pressure of the pipeline gas reaching the letdown station is in the range of about 150 to 250 psia; in such case, it is desirable that the pressure be at least doubled after the gas has passed through the two stages of compression. A centrifugal compressor coupled to a turbo-expander is used for each stage of compression and expansion.

Pipeline gas is herein used to mean natural gas or synthetic natural gas having a very high methane content and a heating value of at least about 950 British Thermal Units per standard cubic foot. Pipeline gas reaching letdown stations invariably contains moisture which would freeze during the expansion of the gas and cause plugging of the equipment with possible damage thereto. A simple and inexpensive method of removing moisture from the pipeline gas involves the injection of a small quantity of methanol into the gas so that the moisture merely condenses during expansion of the gas and is separated from the expanded gas as a water-methanol solution. This method has been integrated with the novel generation of refrigeration according to this invention so that some of the energy derived from reducing the pressure of the pipeline gas is utilized to separate methanol from the water-methanol solution. Thus, regenerated methanol can be recycled for injection into pipeline gas to be work expanded according to this invention.

BRIEF DESCRIPTION OF THE DRAWINGS

For further clarification of the invention, the ensuing description will refer to the appended drawings of which:

FIG. 2 as modified by FIG. 3 is the flow diagram of another preferred embodiment of the invention yielding both low level and high level refrigeration.

DESCRIPTION OF PREFERRED EMBODIMENTS

Figure 1:
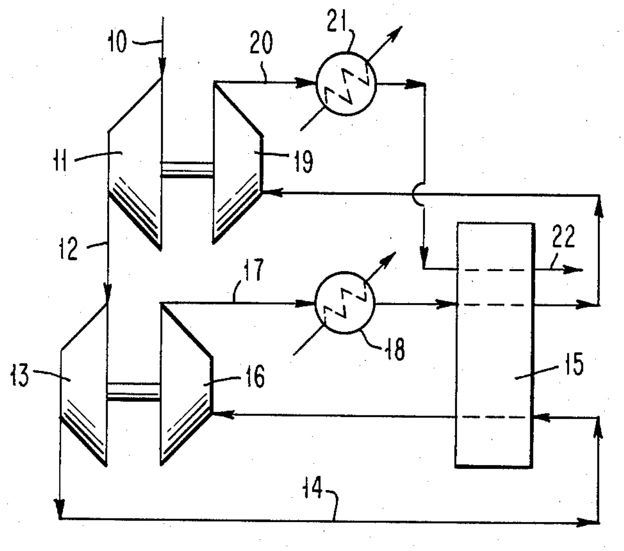
FIG. 1 is a flow diagram of the basic process of the invention whereby refrigeration is produced while reducing the high pressure of pipeline gas to the lower pressure of the distribution system into which the gas is discharged.

FIG. 1 is a flow diagram of the basic process of the invention which can be used with dehydrated pipeline gas. High pressure pipeline gas which has been dehydrated flows through line 10 into centrifugal compressor 11, thence through line 12 into centrifugal compressor 13, and thence through line 14 at a pressure at least 150 psi higher than the pressure of the gas in line 10. The hot compressed gas in line 14 is cooled by passage through heat exchanger 15 and is partially expanded with the performance of work substantially without liquefaction of the gas in turbo-expander 16. The resulting cold expanded gas flows through line 17, refrigeration recovery exchanger 18 and heat exchanger 15 wherein the partially expanded gas is warmed by heat indirectly transferred from the hot compressed gas flowing through line 14. The reheated gas leaving exchanger 15 through line 17 passes through turbo-expander 19. The further expanded cold gas flows through line 20, refrigeration recovery exchanger 21 and heat exchanger 15 to help cool the compressed hot gas in line 14 passing through exchanger 15. The gas leaving exchanger 15 through line 22 flows into the distribution system. Compressor 11 is directly driven by expander 19 and the work of compressor 13 is similarly performed by expander 16. Hence, refrigeration is produced by the invention without any external power supply. Antifreeze or other suitable fluid passed through refrigeration exchangers 18 and 21 may by used to convey the recovered refrigeration to one or more operations requiring refrigeration, such as the commercial freezing of fish and meat.

Figure 2:
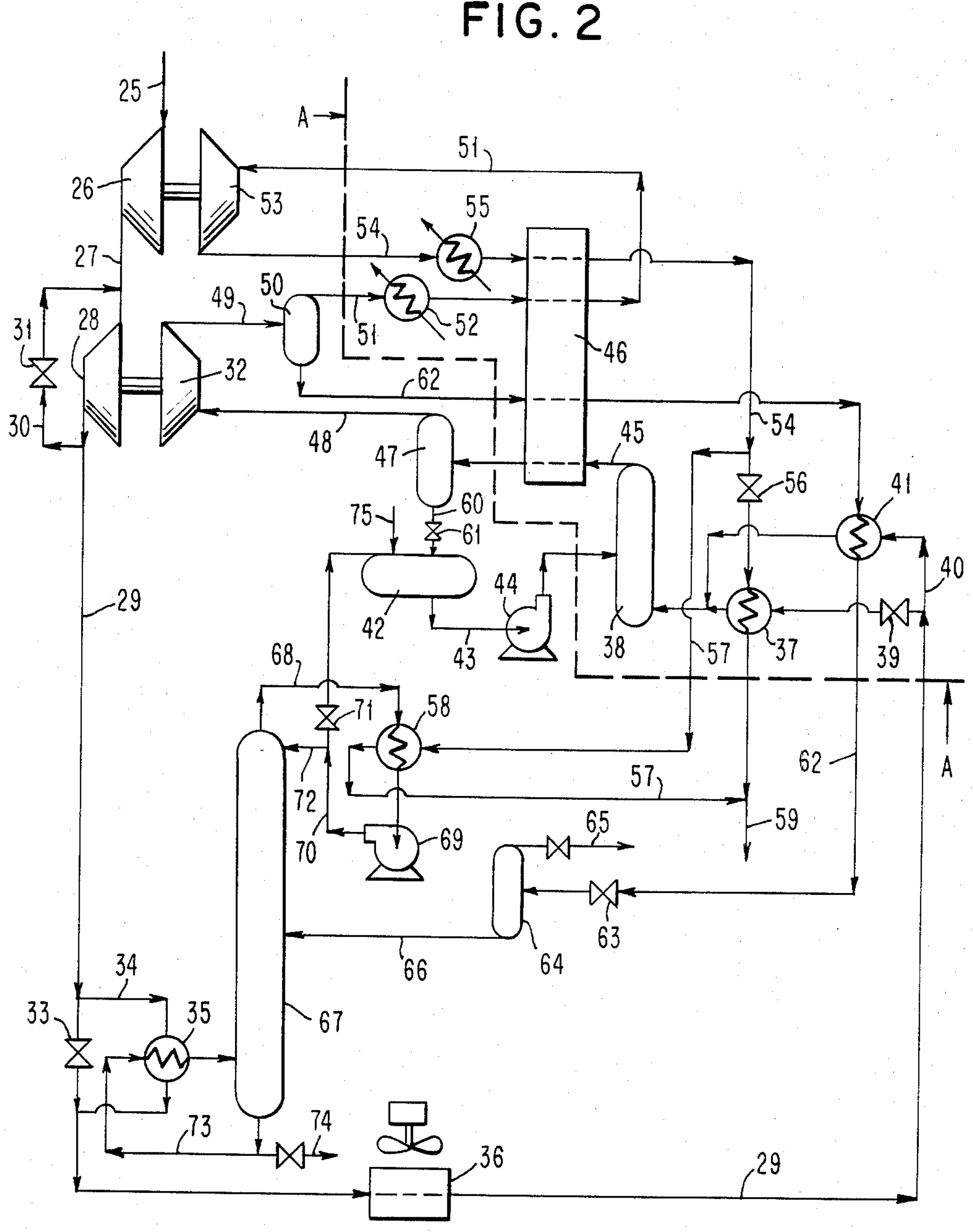
FIG. 2 is a flow diagram of a preferred embodiment of the invention yielding low level refrigeration.

FIG. 2 is a flow diagram of the basic process of the invention just described with reference to FIG. 1 but modified to incorporate a preferred method of eliminating the moisture usually present in pipeline gas. The description of FIG. 2 will include a specific example in which the pipeline gas is substantially pure methane containing a small amount of moisture.

The pipeline gas at a pressure of 215 psia and a temperature of 70° F. in line 25 passes through centrifugal compressor 26, line 27 and centrifugal compressor 28 and discharges into line 29 at 520 psia and 260° F. Branch line 30 with reducing valve 31 may be used to recycle a small portion of the pipeline gas leaving compressor 28 back to inlet line 27; this recycle stream is used, when required, to balance the work load on compressor 28 with the power generated in turbo-expander 32 which is directly coupled with compressor 28. Control valve 33 is used to divert about a quarter of the gas in line 29 through branch line 34 and reboiler 35 before rejoining the gas in line 29 which reaches air cooler 36 at 518 psia and about 250° F. Thence, the gas at 508 psia and 163° F. continues its flow through line 29 and heat exchanger 37, discharging into contact tower 38. Control valve 39 diverts about 1% of the gas in line 29 through branch line 40 and heat exchanger 41 before rejoining the gas entering tower 38 at 505 psia and 135° F.

Methanol in tank 42 flows through line 43 and pump 44 into tower 38 at the rate of about 575 pounds per million standard cubic feet of gas passing through tower 38. The gas with vaporized methanol flows from tower 38 through line 45 and heat exchanger 46 into separator 47 at 500 psia and 65° F. wherein condensate is removed from the gas before it enters expander 32 via line 48. The gas expanded substantially without liquefaction of the gas leaves expander 32 at 125 psia and −65° F., discharging from line 49 into separator 50 wherein an aqueous methanol condensate is removed from the cold partially expanded gas which then flows through line 51 and refrigeration recovery exchanger 52. Thence, the gas at 123 psia and −10° F. passes through exchanger 46 and enters turbo-expander 53 at 120 psia and 33° F.

The further expanded gas at 40 psia and −65° F. flows from expander 53 through line 54 and refrigeration recovery exchanger 55, discharging therefrom at 37 psia and −10° F. Thence, the gas passes through exchanger 46 and at 33 psia and 33° F. flows through line 54 and exchanger 37. Control valve 56 is used to divert a small portion of the gas in line 54 through branch line 57 and condenser 58; the small stream of line 57 then rejoins the gas in line 54. All of the gas processed by the invention reaches point 59 at 30 psia and 80° F. ready for the distribution system.

Part of the methanol added to the gas in tower 38 drops out as condensate in separator 47 from which it is drained through line 60 and reducing valve 61 into tank 42. The remaining part of the methanol in the gas is removed from the cold expanded gas flowing into separator 50 as an aqueous methanol condensate. This aqueous condensate containing about 95% by weight methanol flows through line 62, exchanger 46 and exchanger 41, reaching reducing valve 63 at 120 psia and 80° F. The aqueous condensate discharges into separator 64 at 20 psia and 60° F. Trace quantities of inert gases released from the condensate in separator 64 are vented through valved line 65.

The condensate passes from separator 64 through line 66 to an intermediate level in distillation column 67. Methanol vapor leaves the top of column 67 through line 68 and is condensed in condenser 58. The liquid methanol is pumped by pump 69 through line 70 to tank 42 for reuse in dehydrating the pipeline gas supplied by line 25. Control valve 71 in line 70 is used to regulate the amount of methanol returned via line 72 as reflux to column 67. Water collecting at the bottom of column 67 circulates through line 73 and reboiler 35 to supply heat to column 67. Valved line 74 is used to drain water from column 67 as required. A very small amount of the methanol injected into the pipeline gas remains in the gas in line 59 supplying the distribution system. This loss of methanol, about 6.5 pounds per million standard cubic feet of pipeline gas undergoing dehydration, is replenished by fresh methanol added to tank 42 through line 75.

Refrigeration is recovered at exchanger 52 at the rate of about 105 tons per million standard cubic feet of pipeline gas processed per hour by the invention and at exchanger 55 about 100 tons. Hence, a large tonnage of valuable refrigeration is generated from energy that would be wasted if the pressure of pipeline gas were reduced by isenthalpic expansion as practiced at many letdown control stations.

Figure 3:
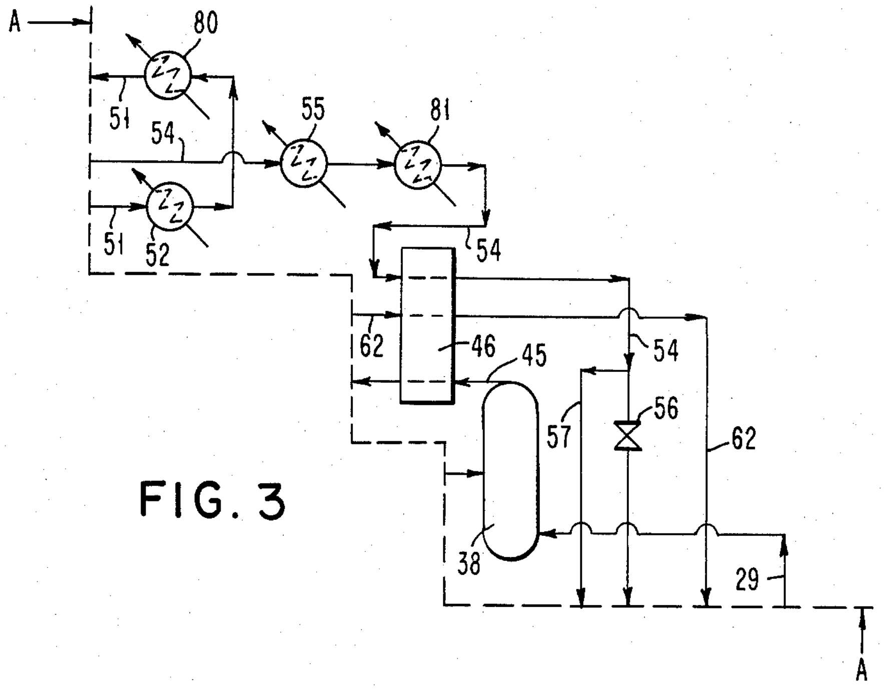
FIG. 3 is a partial flow diagram showing a modification of the upper right portion of FIG. 2 indicated thereon by dotted line A—A.

FIG. 3 shows a modification of the flow diagram of FIG. 2 which enables the process of the invention to deliver refrigeration at two levels. Reference numerals appearing in FIG. 2 are applied to corresponding elements of FIG. 3. Two new elements in FIG. 3 are high level refrigeration exchangers with reference numerals 80 and 81. Comparing FIG. 3 with the portion of FIG. 2 which it replaces, it is evident that elements 37, 39, 40 and 41 of FIG. 2 have been eliminated. The expanded gas in line 51 after passing through low level refrigeration exchanger 52 flows through high level refrigeration exchanger 80 rather than exchanger 46 before entering expander 53. The further expanded gas in line 54 after passing through low level refrigeration exchanger 55 flows through high level refrigeration exchanger 81 before passing through exchanger 46.

The gas leaving exchanger 51 at 123 psia and −10° F. issues from exchanger 80 at 120 psia and 33° F. Similarly, the gas leaving exchanger 55 at 37 psia and −10° F. issues from exchanger 81 at 34 psia and 33° F. It is noteworthy that the aforesaid 105 tons of refrigeration delivered at exchanger 52 and the 100 tons delivered at exchanger 55 per million standard cubic feet of pipeline gas processed per hour according to the example based on FIG. 2 remain substantially unchanged at the corresponding exchangers in the modification of the process shown in FIG. 3 which additionally yields about 81 tons of high level refrigeration at exchanger 80 and about 79 tons at exchanger 81 per million standard cubic feet of pipeline gas processed per hour according to FIG. 3. While the example of FIG. 2 delivers a total of about 205 tons of low level refrigeration per million standard cubic feet per hour of pipeline gas, the example of FIG. 3 delivers a total of about 160 tons of high level refrigeration per million standard cubic feet per hour of pipeline gas as well as 205 tons of low level refrigeration.

Hence, FIG. 3 yields 80% more refrigeration than FIG. 2 but the additional refrigeration is available at a temperature approaching about −5° F. whereas the low level refrigeration is available at a temperature approaching about −60° F. In short, FIG. 3 is justified when there are customers who require refrigeration at different temperature levels for their respective operations, for example, a customer utilizing low level refrigeration to freeze fish and a customer utilizing high level refrigeration in a cold storage warehouse. Generally, low level refrigeration is recovered at a temperature below about −40° F. and high level refrigeration is recovered at a temperature below about 20° F.

Processes for dehydrating gas are well known. Solid or liquid desiccants are used in some of the processes. However, in the absence of unusual circumstances, it is believed that the injection of methanol into pipeline gas and its recovery for continuous reuse as already described with reference to FIG. 2 is economically more attractive than the known processes for dehydrating gas.

Many variations and modifications of the invention will be apparent to those skilled in the art without departing from the spirit and scope of the invention. For example, the gas streams of lines 51 and 54 may be separately passed through a single refrigeration exchanger, replacing exchangers 52 and 55, in countercurrent relation to one heat transfer fluid used to convey the refrigeration to one or more utilization sites. Similarly, in FIG. 3 the cold gas in line 51 may flow through a single exchanger, replacing exchangers 52 and 80, in countercurrent relation to a heat transfer fluid entering the warm end of the exchanger and exiting at an intermediate portion of the exchanger where another heat transfer fluid would enter for flow to, and withdrawal from, the cold end of the exchanger. The first mentioned heat transfer fluid would convey refrigeration to the customer requiring high level refrigeration and the other heat transfer fluid would convey refrigeration to the customer requiring low level refrigeration. Exchangers 55 and 81 may likewise be replaced by a single exchanger.

In FIG. 2 the gas in line 48 may be passed through expander 53 and in such case the gas in line 51 will be passed through expander 32. Two levels of refrigeration may also be recovered in the process of FIG. 1 by having the gas in line 17 pass through low level refrigeration exchanger 18 and a high level refrigeration exchanger directly into expander 19, while the gas in line 20 passes through low level refrigeration exchanger 21 and a high level refrigeration exchanger before the gas enters exchanger 15. Accordingly, only such limitations should be imposed on the invention as are set forth in the appended claims.

What is claimed is:

1. A process for reducing the high pressure of pipeline gas to a predetermined low pressure of a distribution system while generating refrigeration solely with energy derived from the reduction of pressure which comprises compressing said gas in two successive stages to increase the pressure thereof at least about 150 psi, injecting methanol into the thus compressed gas, cooling said compressed gas containing methanol by heat exchange with said gas after expansion as hereinafter set forth, expanding the cooled gas with the performance of work substantially without liquefaction of said gas, said work being utilized in one of said two stages of compression, separating an aqueous methanol condensate from the expanded gas and subjecting said condensate to distillation for the recovery and reuse of said methanol, said distillation receiving reboiler heat from said compressed gas prior to said cooling thereof, recovering low level refrigeration from the thus dehydrated expanded gas and then further expanding said dehydrated expanded gas with the performance of further work substantially without liquefaction of said gas, said further work being utilized in the other of said two stages of compression, recovering low level refrigeration from the further expanded gas and then passing said further expanded gas in countercurrent heat exchange relation with said compressed gas to effect cooling thereof as hereinbefore set forth, utilizing said further expanded gas to provide reflux cooling to said distillation, and thereafter discharging said further expanded gas at said predetermined low pressure into said distribution system.

2. The process of claim 1 wherein high level refrigeration is recovered from the expanded gas after recovering low level refrigeration therefrom and high level refrigeration is recovered from the further expanded gas after recovering low level refrigeration therefrom.

3. The process of claim 2 wherein the high pressure of the pipeline gas is in the range of about 100 to 400 psia, the low level refrigeration is recovered at a temperature below about −40° F. and the high level refrigeration is recovered at a temperature below about 20° F.

4. The process of claim 1 wherein the work performed by the expansion of the cooled gas is utilized in the second stage of compression, and the further work performed by the further expansion of the expanded gas is utilized in the first stage of compression.

5. The process of claim 1 wherein the expanded gas after recovering low level refrigeration therefrom is passed in countercurrent heat exchange relation with the compressed gas prior to the expansion thereof.

6. The process of claim 1 wherein the high pressure of the pipeline gas is in the range of about 150 to 250 psia and said high pressure is at least doubled after said gas has been compressed in two successive stages.

7. The process of claim 1 wherein the separated aqueous methanol condensate is warmed by heat exchange with the compressed gas before said condensate is subjected to distillation.

8. An apparatus for reducing the high pressure of pipeline gas to a predetermined low pressure of a distribution system and for recovering refrigeration generated solely with energy derived from the reduction of pressure which comprises:

a. a first centrifugal compressor coupled to a first turbo-expander, the inlet of said first compressor being connected for the entry of said pipeline gas;

b. a second centrifugal compressor coupled to a second turbo-expander, the inlet of said second compressor being connected to the outlet of said first compressor;

c. a distillation column with its reboiler connected for passage therethrough of compressed gas from said second compressor;

d. means for injecting methanol into said compressed gas;

e. a heat exchanger having a first flow path therein connected to the outlet of said second compressor and to the inlet of one of said first and second turbo-expanders;

f. a gas-liquid separator connected to the outlet of said one turbo-expander, the liquid outlet of said separator being connected to an intermediate level of said distillation column;

g. a first refrigeration recovery exchanger connected to the gas outlet of said separator and to the inlet of the other of said first and second turbo-expanders; and h. a second refrigeration recovery exchanger connected to the outlet of said other turbo-expander and to a second flow path in said heat exchanger, said second flow path being countercurrent to said first flow path and being connected to pass gas leaving said second flow path through the reflux condenser of said distillation column and to discharge gas into said distribution system.

9. The apparatus of claim 8 wherein a first auxiliary refrigeration recovery exchanger is connected in series with the first refrigeration recovery exchanger, and a second auxiliary refrigeration recovery exchanger is connected in series with the second refrigeration recovery exchanger.

10. The apparatus of claim 8 wherein the outlet of the first refrigeration recovery exchanger is connected to a third flow path in the heat exchanger, said third flow path being countercurrent to the first flow path and being connected to the inlet of the other of the first and second turbo-expanders.

11. The apparatus of claim 9 wherein the first flow path of the heat exchanger connected to the outlet of the second compressor is connected to the inlet of the second turbo-expander, the first refrigeration recovery exchanger is connected to the outlet of said second turbo-expander, and the first auxiliary refrigeration recovery exchanger is connected to the inlet of the first turbo-expander.

12. The process of claim 1 wherein the high pressure of the pipeline gas is in the range of about 100 to 400 psia.

* * * * *